US 6,582,180 B2

(12) United States Patent
Fochler et al.

(10) Patent No.: US 6,582,180 B2
(45) Date of Patent: Jun. 24, 2003

(54) SEPARATING CONVEYOR FOR STACKED OBJECTS

(75) Inventors: Fritz Fochler, Senden (DE); Andreas Krüger, Donaurieden (DE); Wolfgang Rodi, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 0 days.

(21) Appl. No.: 10/052,901

(22) Filed: Jan. 18, 2002

(65) Prior Publication Data
US 2002/0098075 A1 Jul. 25, 2002

(30) Foreign Application Priority Data
Jan. 20, 2001 (DE) ......................... 101 02 590

(51) Int. Cl.[7] .............................................. B65H 29/26
(52) U.S. Cl. ................... 414/797.9; 414/797.6
(58) Field of Search ................ 414/790.3, 794.7, 414/797.9, 798.6, 798.7, 797.6

(56) References Cited

U.S. PATENT DOCUMENTS

| 3,073,460 A | * | 1/1963 | Richert et al. | ............ 414/798.7 |
| 3,245,518 A | * | 4/1966 | Uno | ................... 198/801 |
| 3,599,805 A | * | 8/1971 | Spencer et al. | ............. 414/790 |
| 4,352,265 A | * | 10/1982 | Hansel et al. | ................. 53/541 |
| 5,044,876 A | * | 9/1991 | Stohlquist | ............... 414/798.2 |
| 5,081,821 A | * | 1/1992 | Meives | ......................... 53/466 |
| 5,713,718 A | * | 2/1998 | Okura et al. | ............. 414/797.9 |

FOREIGN PATENT DOCUMENTS

| DE | 1 198 284 | 4/1966 |
| DE | 29 30 071 | 1/1981 |

* cited by examiner

Primary Examiner—Janice L. Krizek
Assistant Examiner—Michael J. Kwon
(74) Attorney, Agent, or Firm—Herbert Dubno; Andrew Wilford

(57) ABSTRACT

An object-sorting system has a conveyor having a horizontally extending stretch, a plurality of pushers fixed on and spaced along the conveyor and extending upward from the stretch thereof, and an upright chute adapted to hold a stack of objects and having a downwardly open outlet spaced above an upstream end of the conveyor stretch. An elongated support surface extends horizontally above the stretch and has an upstream end below the outlet port. A drive advances the stretch and thereby displaces the pushers downstream past the outlet so that the pushers engage at least a lowermost object of the stack in the chute and move the engaged object(s) downstream along the support surface. The support surface can pivot about an axis at the support-surface downstream end and thereby change a vertical spacing between the support surface upstream end and the outlet port.

11 Claims, 6 Drawing Sheets

SEPARATING CONVEYOR FOR STACKED OBJECTS

FIELD OF THE INVENTION

The present invention relates to an apparatus for separating stacked objects and displacing them one at a time or as groups to a treatment location. More particularly this invention concerns a separating conveyor.

BACKGROUND OF THE INVENTION

In many industrial objects are stacked one atop the other in an upright chute having an open lower outlet positioned above a horizontally extending conveyor provided with a plurality of upstanding seat-forming pushers. The objects are picked off the bottom of the stack, either one at a time or in groups, by the pushers as they pass underneath so as to transport the object(s) that have been picked off downstream to a location where they are, for instance, boxed.

The conveyor typically is formed as one or more parallel belts or chains from which the pushers extend upward. The picked-off objects can rest directly on the conveyor, or move along another surface positioned somewhat above the conveyor and provided with slots through which the pushers project as described in German 1,198,284. Stops may be provided to hold back the stack as the bottom objects are stripped away as described in German 2,930,071.

While such systems are extremely effective, it is often quite difficult to adjust them to accommodate objects or groups of objects of different heights. Thus when the system must be switched over to strip out, for instance, a taller object or a taller group of objects, it is necessary to fit the conveyor with taller pushers and/or change the height of the lateral outlet port of the chute. Either procedure requires that the system be shut down and parts be removed and/or replaced.

OBJECTS OF THE INVENTION

It is therefore an object of the present invention to provide an improved sorting or separating conveyor.

Another object is the provision of such an improved conveyor which overcomes the above-given disadvantages, that is which can easily be reset for objects or objects groups of different heights.

SUMMARY OF THE INVENTION

An object-sorting system has according to the invention a conveyor having a horizontally extending stretch, a plurality of pushers fixed on and spaced along the conveyor and extending upward from the stretch thereof, and an upright chute adapted to hold a stack of objects and having a downwardly open outlet spaced above an upstream end of the conveyor stretch. An elongated support surface extends horizontally above the stretch and has an upstream end below the outlet port and a downstream end so that the stack of objects in the chute can stand on the support surface. A drive advances the stretch and thereby displaces the pushers downstream past the outlet so that the pushers engage at least a lowermost object of the stack in the chute and move the engaged object(s) downstream along the support surface. In accordance with the invention the support surface can pivot about an axis at the support-surface downstream end and thereby change a vertical spacing between the support-surface upstream end and the outlet port.

Thus with this system when the height of the object or group of objects being picked out of the chute changes, all that need change is the angular position of the support surface. For taller objects or object groups, the surface is pivoted down, and for shorter objects or object groups it is pivoted up. There is no need to change the pushers whose effective length, that is the amount they project past the surface, is determined by the position of this surface.

The support surface according to the invention is formed with longitudinally extending slots along which the pushers pass. In addition the stretch is inclined upward from its upstream end to its downstream end. Thus the pushed objects will be urged by gravity against the pushers which, according to the invention, are spaced apart to define seats having a longitudinal dimension greater than a predetermined maximum object length. Thus the pushers can be permanently mounted on the conveyor which need merely be speeded up a little to work with extremely short objects. There is no need to provide structure defining the leading ends of the object-receiving seats.

The chute in accordance with the invention has telescoping side plates attached to the support surface. In addition it has a closable holding flap controlled with and by the telescoping side plates. Such a flap can bear in an upstream direction on the lower end of the stack in the chute so that it is not entrained by the surface and will only move off when the objects are actually engaged by the pushers and positively entrained.

The support surface can be formed by a longitudinally slotted plate and by one or more belts riding on the plate. In addition the pushers are pivotal on the conveyor between an up position extending transversely thereto and a down position extending generally parallel thereto. A cam arrangement pivots the pushers into the down position except in the stretch. A stationary stop plate extends transversely across the stretch at the downstream end thereof and a boxing apparatus can be provided at the downstream end for removing the objects from the downstream end of the stretch and packaging them.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
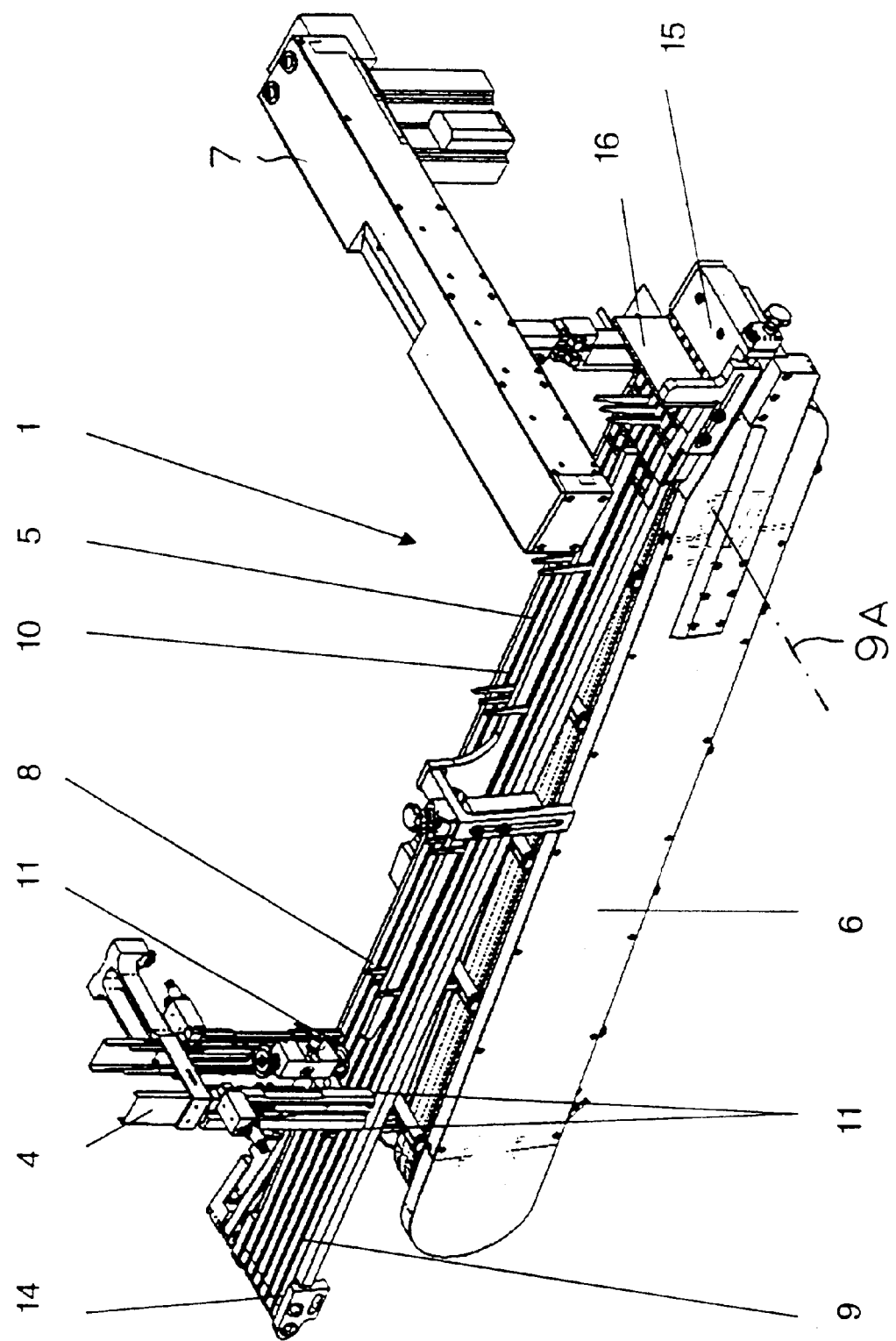
FIG. 1 is a small-scale perspective view of the conveyor according to the invention.
Figure 2:
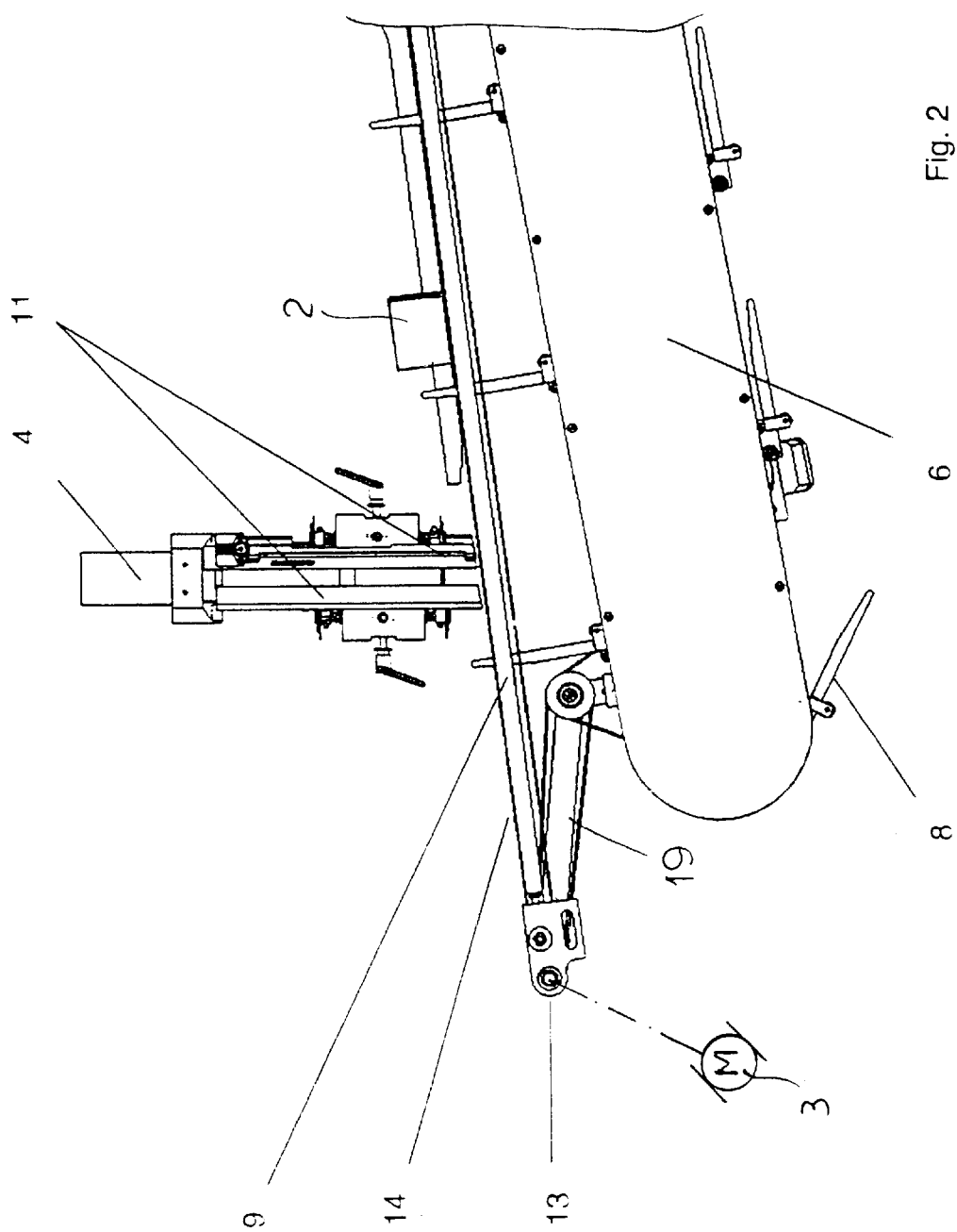
FIG. 2 is a side view of the upstream end of the conveyor set up to pick off a relatively short object or object group.
Figure 3:
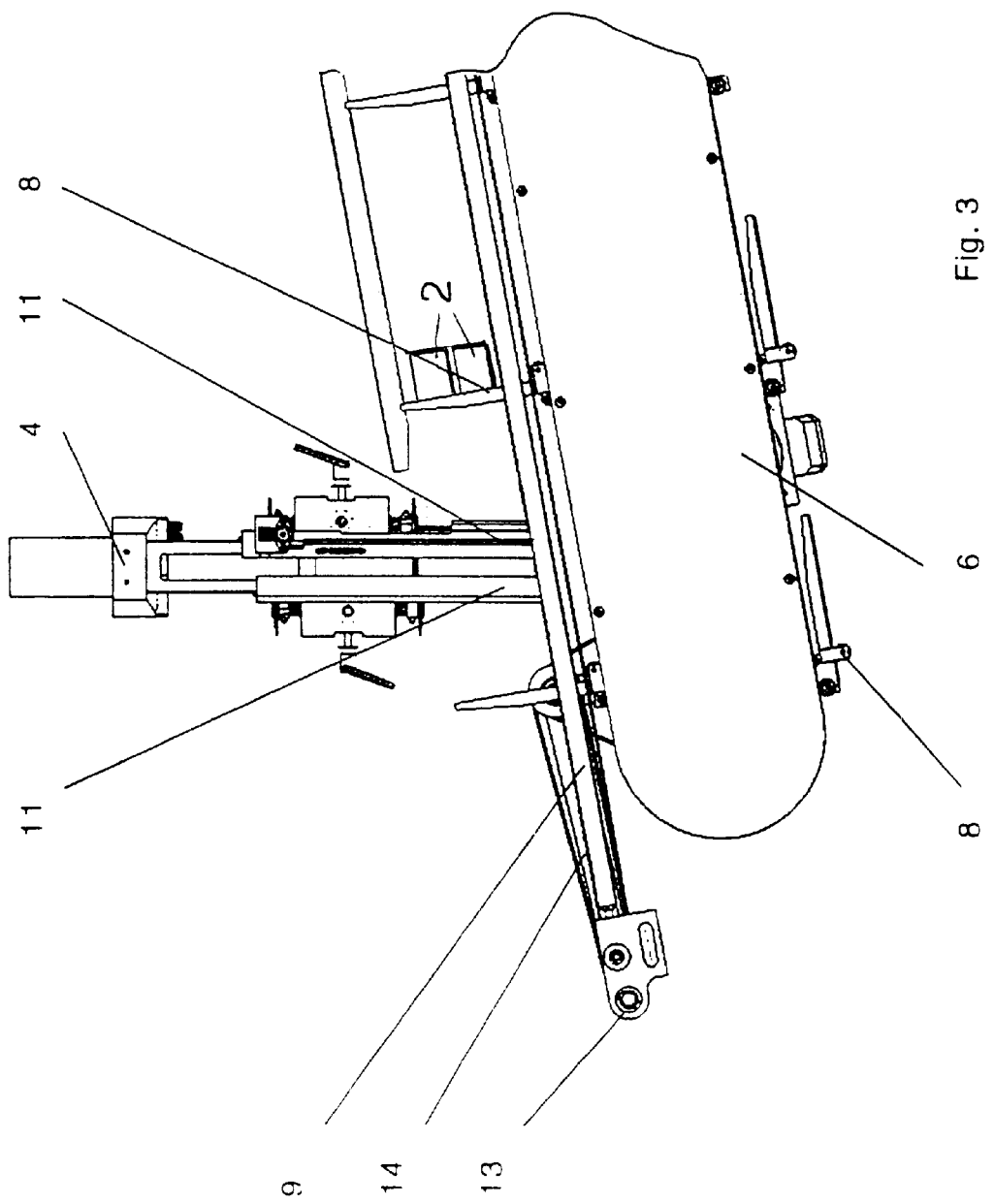
FIG. 3 is a view like FIG. 2 but with the conveyor set up for a taller object or object stack.
Figure 6:
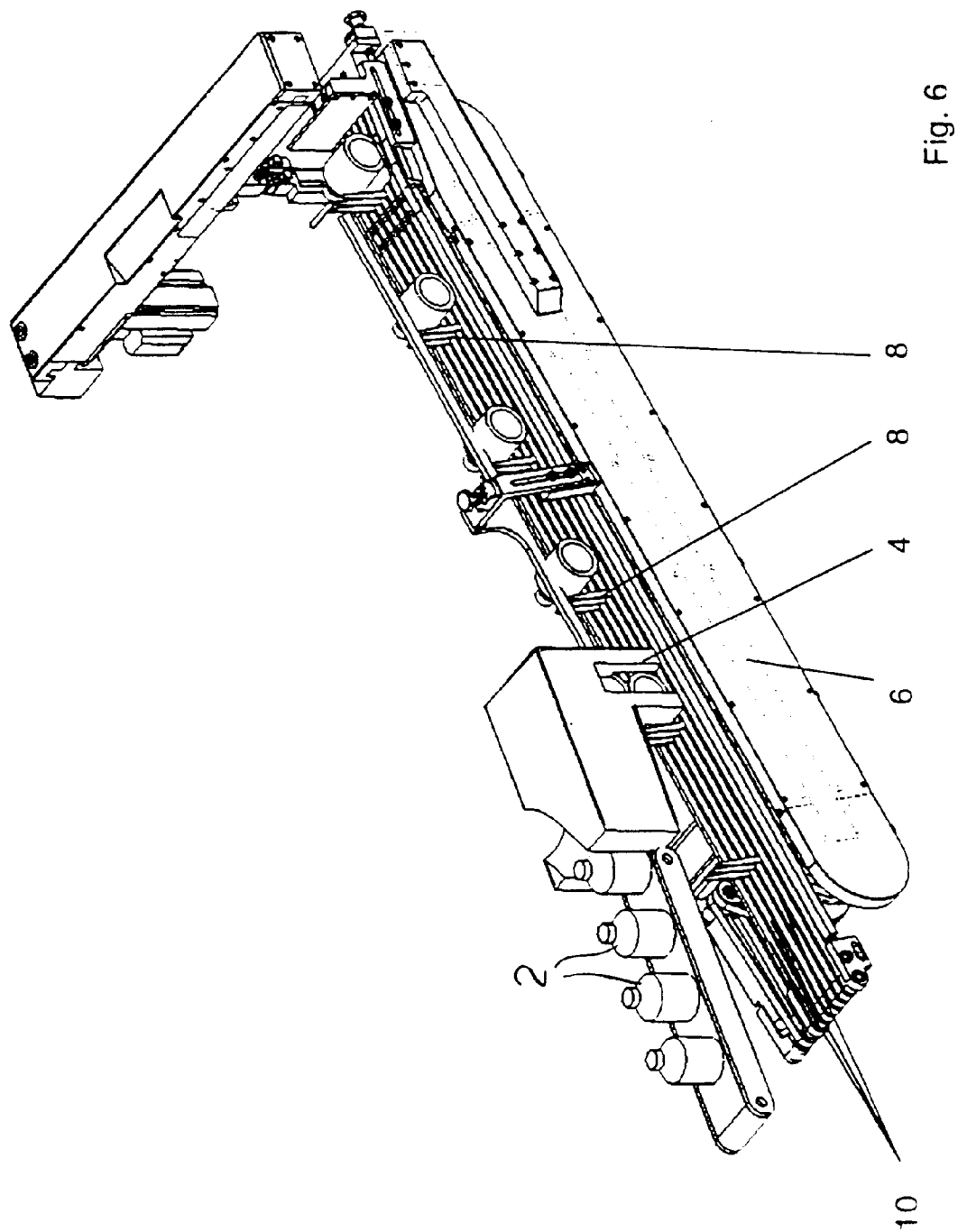
FIG. 6 is a perspective view like FIG. 5 showing the conveyor being used to sort individual bottles.

As seen in FIGS. 1 through 3 a separating/sorting system 1 according to the invention has a supply chute 4 holding a stack of objects 2. A conveyor 6 has an upstream underneath the chute 4 and extends upward at a slight angle therefrom. It has a plurality of spaced pushers 8 defining seats 5 each adapted to hold one or more of the objects 2 and is advanced by a drive 3 to move the pushers 8 downstream, that is from left to right as shown in the drawing. FIG. 6 shows how bottles 2' can also be sorted by the system of this invention.

In accordance with the invention a support surface 9 extends horizontally above the upper stretch of the conveyor 6 and has a plurality of longitudinally extending slots 10 through which the pushers 8 project. This surface 9 is pivotal about an axis 9A at its downstream end so as to move between the high position of FIG. 2 and the low position of FIG. 3. Thus if the pushers are to only pick off a single one of the objects, the upstream end of the surface 9 is raised as shown in FIG. 2, but if more are to be picked off, the end is lowered as in FIG. 3. In order to maintain the objects in a stack in the chute 2, it has telescoping side plates 11 connected to the surface 9. An outlet flap also connected with the side plates 11 and set to open each time a pusher passes can be employed to maintain the stack in the chute 4.

Belts 14 lying on the surface 9 and spanned over wheels 13 at the upstream and downstream ends of the conveyor 6 ensure that the objects 2 move easily downstream. The upstream wheels 13 are connected via a transmission 19 to the conveyor 6 so that the belts 14 move synchronously with the pushers 8.

Figure 4:
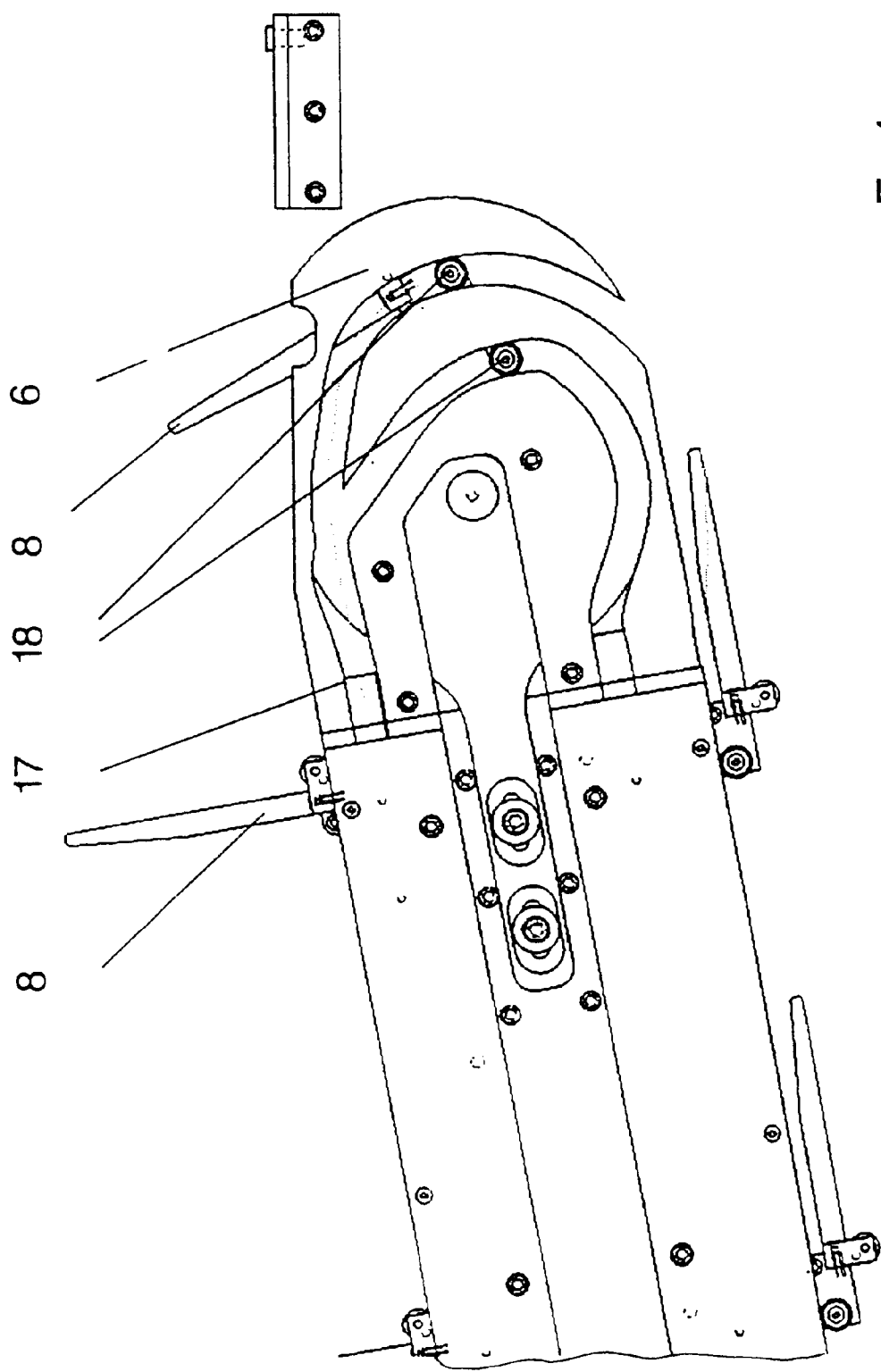
FIG. 4 is a larger-scale view of a downstream end of the conveyor.
Figure 5:
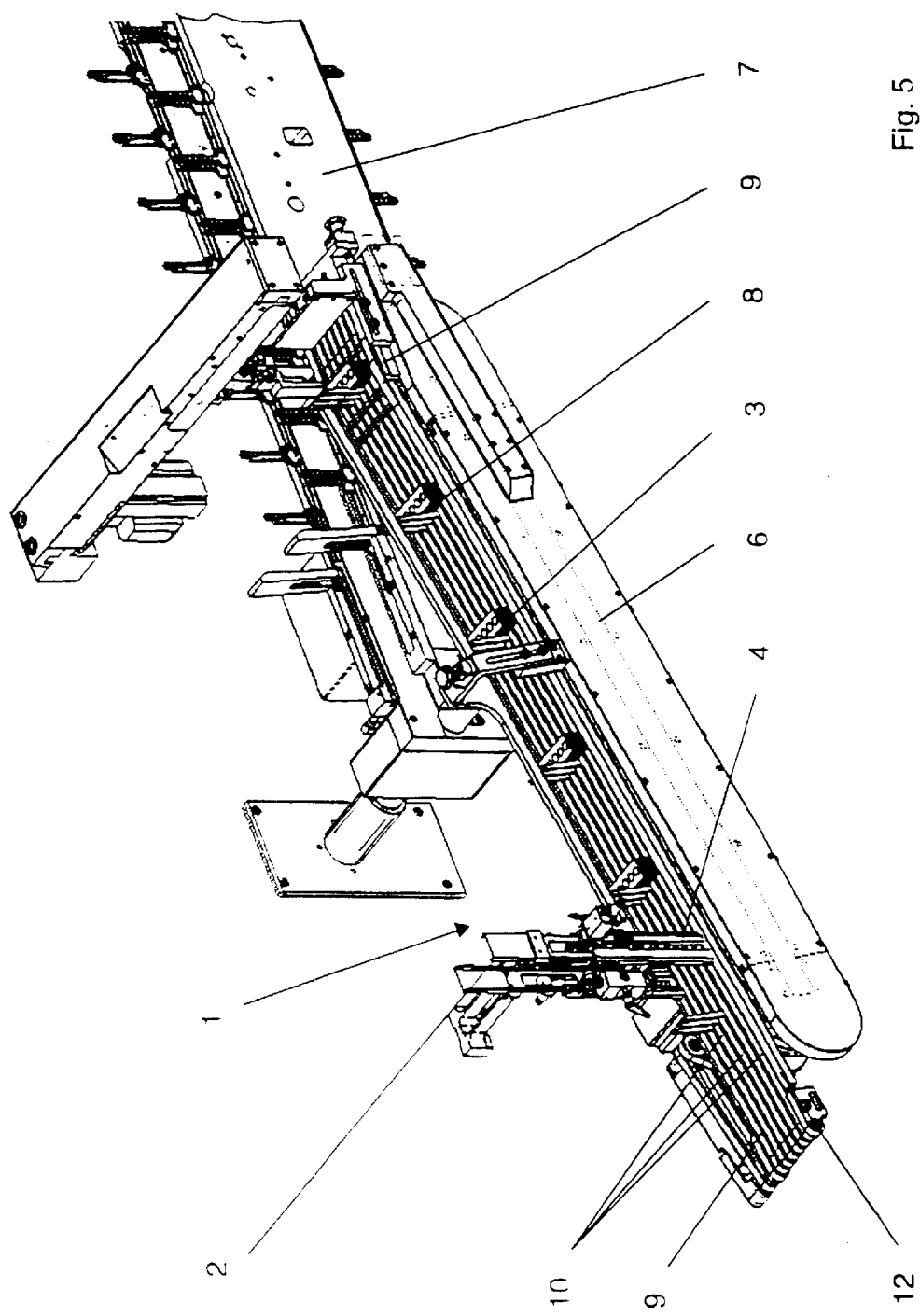
FIG. 5 is a perspective view showing the conveyor coupled with a packing machine.

A support 15 carries a fixed upright stop plate 16 at the downstream end of the conveyor 6 so that a boxing machine 7 (see also FIG. 5) can transversely pick off the object(s) 2 being advanced by the pushers 8. In order to prevent the pushers 8 from colliding with the stop plate 16, the pushers 8 are carried as shown in FIG. 4 on rollers 18 that ride n a cam slot 17 configured to move them from an up position projecting perpendicular to the conveyor 6 to a down position parallel thereto. Thus only in the upper stretch of the conveyor 6 upstream of the stop plate 16 are the pushers 8 erect; otherwise they are retracted and out of the way.

We claim:

1. An object-sorting system comprising:

a conveyor having a horizontally extending stretch;

a plurality of pushers fixed on and spaced along the conveyor and extending upward from the stretch thereof;

an upright chute adapted to hold a stack of objects and having an outlet port spaced above an upstream end of the conveyor stretch;

an elongated support surface extending horizontally above the stretch and having an upstream end below the outlet port and a downstream end, whereby the stack of objects in the chute can stand on the support surface;

drive means for displacing the pushers downstream past the outlet port so that the pushers engage at least a lowermost object of the stack in the chute and move the engaged object downstream along the support surface; and means for pivoting the support surface about an axis at the support-surface downstream end and thereby changing a vertical spacing between the support-surface upstream end and the outlet port.

2. The object-sorting system defined in claim 1 wherein the support surface is formed with longitudinally extending slots along which the pushers pass.

3. The object-sorting system defined in claim 1 wherein the stretch is inclined upward from its upstream end to its downstream end.

4. The object-sorting system defined in claim 1 wherein the pushers are spaced apart to define seats having a longitudinal dimension greater than a predetermined maximum object length.

5. The object-sorting system defined in claim 1 wherein the chute has telescoping side plates attached to the support surface.

6. The object-sorting system defined in claim 1 wherein the support surface is formed by a plate.

7. The object-sorting system defined in claim 1 wherein the support surface is formed by a belt.

8. The object-sorting system defined in claim 7 wherein the support surface is formed by a plurality of belts.

9. The object-sorting system defined in claim 1 wherein the pushers are pivotal on the conveyor between an up position extending transversely thereto and a down position extending generally parallel thereto, the system further comprising cam means for pivoting the pushers into the down position except in the stretch.

10. The object-sorting system defined in claim 9, further comprising a stationary stop plate extending transversely across the stretch at the downstream end thereof.

11. The object-sorting system defined in claim 10, further comprising boxing means at the downstream end for removing the objects from the downstream end of the stretch and packaging them.

* * * * *